(12) United States Patent
Hayes et al.

(10) Patent No.: US 12,214,867 B2
(45) Date of Patent: Feb. 4, 2025

(54) AIRCRAFT BRAKE CONTROL SYSTEM

(71) Applicant: AIRBUS OPERATIONS LIMITED, Bristol (GB)

(72) Inventors: Alexander Hayes, Bristol (GB); Ashley Bidmead, Bristol (GB); Thierry Storme, Bristol (GB); Robert Coombe, Bristol (GB); Mark Johnson, Bristol (GB); Andrew Hebborn, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 168 days.

(21) Appl. No.: 17/650,558

(22) Filed: Feb. 10, 2022

(65) Prior Publication Data
US 2022/0266992 A1  Aug. 25, 2022

(30) Foreign Application Priority Data
Feb. 11, 2021  (GB) ...................................... 2101916

(51) Int. Cl.
| | |
|---|---|
| *B64C 25/00* | (2006.01) |
| *B60T 8/17* | (2006.01) |
| *B60T 8/172* | (2006.01) |
| *B64C 25/46* | (2006.01) |
| *B64D 47/08* | (2006.01) |

(52) U.S. Cl.
CPC ............ *B64C 25/46* (2013.01); *B60T 8/1703* (2013.01); *B60T 8/172* (2013.01); *B64D 47/08* (2013.01)

(58) Field of Classification Search
CPC ....... B64C 25/34; B64C 25/46; B60T 8/1703; B60T 8/172; B60T 8/325; B64D 45/00; B64D 47/08; B64D 2045/0085
See application file for complete search history.

(56) References Cited

U.S. PATENT DOCUMENTS 3,764,182 A * 10/1973 Andreyko ............. B60T 8/1766
                                                        303/114.1
3,926,479 A * 12/1975 Bissell .................. B60T 8/1703
                                                        303/122.04

(Continued)

FOREIGN PATENT DOCUMENTS

FR        2500798         9/1982

OTHER PUBLICATIONS

Extended European Search Report for Application No. 22156313.3, eight pages, dated May 31, 2022.

(Continued)

*Primary Examiner* — Phutthiwat Wongwian
*Assistant Examiner* — Sherman D Manley
(74) *Attorney, Agent, or Firm* — Nixon & Vanderhye P.C.

(57) ABSTRACT

An aircraft brake control system for controlling anti-skid braking of at least first and second wheels in a wheel set of an aircraft is disclosed. The system includes a control assembly having wheel speed inputs including an input of an indication of the wheel speed of the first wheel, and an input of an indication of the wheel speed of the second wheel, a wheel speed comparator for determining which of the wheel speeds indicated is a lowest wheel speed, and an output for indicating a wheel speed other than the lowest wheel speed. An aircraft landing gear, an aircraft, and methods of braking an aircraft are also disclosed.

21 Claims, 4 Drawing Sheets

(56) References Cited

U.S. PATENT DOCUMENTS

| | | | | |
|---|---|---|---|---|
| 4,007,970 | A * | 2/1977 | Romero | B60T 8/1703 |
| | | | | 303/20 |
| 4,232,910 | A * | 11/1980 | Snyder | B60T 8/1708 |
| | | | | 303/123 |
| 5,615,934 | A * | 4/1997 | Abuelsamid | B60T 8/172 |
| | | | | 303/167 |
| 6,478,252 | B1 * | 11/2002 | Stimson | B60T 13/66 |
| | | | | 188/264 R |
| 6,513,885 | B1 * | 2/2003 | Salamat | B60T 8/1703 |
| | | | | 303/DIG. 9 |
| 6,851,649 | B1 * | 2/2005 | Radford | B60T 8/325 |
| | | | | 188/264 R |
| 7,165,816 | B2 * | 1/2007 | DeVlieg | B60T 8/325 |
| | | | | 303/155 |
| 8,029,074 | B2 * | 10/2011 | Cahill | B60T 8/1703 |
| | | | | 303/122.03 |
| 8,376,273 | B2 * | 2/2013 | Thompson | B64C 25/48 |
| | | | | 244/110 A |
| 8,965,657 | B2 * | 2/2015 | Georgin | B60T 8/1703 |
| | | | | 701/75 |
| 9,199,615 | B2 * | 12/2015 | Cahill | B64C 25/44 |
| 10,246,063 | B2 * | 4/2019 | Georgin | B60T 8/17616 |
| 10,300,897 | B2 * | 5/2019 | Georgin | B60W 10/188 |
| 10,597,008 | B1 * | 3/2020 | Arsenault | B60T 8/17616 |
| 10,882,500 | B2 * | 1/2021 | Burte | B64D 45/00 |
| 11,691,604 | B2 * | 7/2023 | Landers | B64C 25/46 |
| | | | | 303/126 |
| 2005/0040286 | A1 * | 2/2005 | Radford | B64C 25/46 |
| | | | | 188/264 R |
| 2008/0001471 | A1 * | 1/2008 | Rudd | B60T 8/1764 |
| | | | | 303/3 |
| 2009/0276133 | A1 | 11/2009 | May et al. | |
| 2018/0015910 | A1 * | 1/2018 | Georgin | B60T 8/1703 |
| 2020/0407049 | A1 | 12/2020 | Forghani et al. | |

OTHER PUBLICATIONS

Combined Search and Examination Report for GB2101916.1 dated Jul. 29, 2021, 6 pages.

* cited by examiner

AIRCRAFT BRAKE CONTROL SYSTEM

CROSS RELATED APPLICATION

This application claims priority to United Kingdom Patent Application GB 2101916.1, filed Feb. 11, 2021, the entire contents of which is hereby incorporated by reference.

BACKGROUND OF THE INVENTION

The present disclosure relates to aircraft brake control systems.

The present invention concerns an aircraft brake control system. More particularly, but not exclusively, this invention concerns an aircraft brake control system for controlling anti-skid braking of wheels in a wheel set of an aircraft, the system comprising a control assembly having at least one wheel speed input and an output for providing to an antiskid brake command calculator.

The invention also concerns an aircraft landing gear, an aircraft and methods of braking an aircraft.

Conventional antiskid systems for a set of wheels base the antiskid control for the commonly brake controlled wheel set on the wheel that is moving with the lowest speed (i.e. the wheel that is likely to be skidding the most). Hence, generally, the antiskid brake command calculator calculates the antiskid brake command based on a lowest wheel speed. Hence, the brake command is reduced to unlock that skidding wheel by reducing the brake pressure it experiences. Of course, the other wheels in the wheel set are also supplied with this reduced braking command and hence, the commanded braking performance is temporarily reduced in order to unlock the skidding wheel, and so improve braking performance overall. This also prevents the skidded wheel from bursting due to being in a prolonged skid.

US 2020/0407049 describes an antiskid braking system that can be employed when in a backup mode, i.e. when the hydraulic braking fluid available to be used for braking is finite. Here, the antiskid control is reduced in comparison to conventional antiskid. In other words, the reduction in braking command due to antiskid is less than what it would be simply based on a lowest wheel speed. In the braking system described, the reduction in command is based on a slip error factor (from comparing the dynamic slip of a plurality of wheels and a target slip value).

However, this system only looks at one "observer" wheel speed in each wheel set and so cannot control the antiskid braking based on what more than one wheel is doing. In other words, one wheel in each wheel set is considered to be an accurate depiction of what all other wheels in the wheel set are doing. This may not always be an accurate assumption and may lead to more or less antiskid braking command being applied, than is ideal. In addition, this system does not take into consideration the possibility of wheel or wheel speed indicator failure. Instead, it assumes the wheel speed measured provides an accurate assessment of what that "observer" wheel is doing and bases the antiskid braking command on that "observer" wheel speed.

The present invention seeks to mitigate the above-mentioned problems. Alternatively or additionally, the present invention seeks to provide an improved aircraft brake control system.

SUMMARY OF THE INVENTION

The present invention provides, according to a first aspect, an aircraft brake control system for controlling anti-skid braking of at least first and second wheels in a wheel set of an aircraft, the system comprising a control assembly having wheel speed inputs including an input of an indication of the wheel speed of the first wheel, and an input of an indication of the wheel speed of the second wheel, a wheel speed comparator for determining which of the wheel speeds indicated is a lowest wheel speed, and an output for indicating a wheel speed other than the lowest wheel speed.

Such a system allows for the two or more wheels in the wheel set to be controlled based on a wheel speed, which is not the lowest wheel speed. This increases the brake performance over a conventional anti-skid braking system, which would use an output of a lowest wheel speed to control the antiskid braking command. For example, if the lowest speed wheel (say, for example the first wheel) had in fact failed (e.g. burst) or where its tachometer (wheel speed indicator) had a fault, rather than the wheel had skidded, the braking command (sent to all wheels of the wheel set) is not unnecessarily reduced. This is especially helpful in the situation of a burst tyre, as braking performance is already lowered due to the burst tyre (here, of the first wheel) and so it is especially advantageous not to lower the braking performance further by lowering the braking command to the working wheels (here, the second wheel and any other wheels in the wheel set).

The control assembly may be present in a single control unit or may be distributed between different control units. For example, the wheel speed comparator may be in a separate (but connected) unit to the output.

The invention may be applied to any number of wheels (above one) in a wheel set. The wheels of the wheel set are all commonly controlled by the same braking command (i.e. they are commonly brake controlled wheels). When there are only two wheels in the wheel set, the "wheel speed other than the lowest wheel speed" will be the highest wheel speed of the wheel set. For the avoidance of doubt, the term "wheel set" as used herein should not be construed as covering a group of wheels which are provided on two (or more) different landing gears. In other words, a wheel set cannot be split across multiple landing gears. The wheels of a wheel set may be provided on, or configured for provision on, a single landing gear.

All or only some (but at least two) of the wheels in the wheel set may have their wheel speed indication inputted to the control assembly.

The "wheel speed other than the lowest wheel speed" is an actual speed of one of the wheels. This is instead of, for example, a factor applied to the lowest wheel speed.

The "wheel speed other than the lowest wheel speed" may be the highest wheel speed of the wheel set that is still below a certain likely skid threshold value. The likely skid threshold value may represent a speed above which the wheel is unlikely to be skidding. Hence, the braking command may be reduced only for wheels that are actually likely to be skidding. This likely skid threshold value may be between 5 and 50 knots. It may be between 10 and 30 knots. It may be between 15 and 25 knots. It may be approximately 20 knots.

The "wheel speed other than the lowest wheel speed" may be the highest wheel speed of the wheel set.

Preferably, the control assembly also has one or more inputs providing an indication of whether or not a wheel of the wheel set has skidded, and wherein the output is a selective output configured to indicate a wheel speed other than the lowest wheel speed, if a wheel skid is not indicated, and the lowest wheel speed, if a wheel skid is indicated.

This enables a higher wheel speed (i.e. not the lowest wheel speed) to be used as the base for the antiskid braking command, when there is no wheel skid indicated.

When the lowest speed does in fact indicate a locked/skidding wheel, the antiskid braking command is based on the lowest wheel speed. Hence, when there is a locked/skidded wheel, the braking command sent to that wheel (and the other commonly brake controlled wheels of the wheel set) is reduced to unlock the skid of the (low speed) wheel. This increases braking performance (due to unlocking skidding wheels) and prevents tyres from bursting due to skidding.

However, the system also does not reduce the braking command unnecessarily if the low speed wheel has in fact failed (e.g. already burst) or its tachometer (or other wheel speed monitor) has failed, rather than skidded. In this scenario, the wheel/wheel speed monitor failure is detected and the braking command applied to the wheels of the wheel set would not be reduced because of it and so braking performance would be improved.

Importantly, when there is a wheel skid, the braking command is reduced to unlock the skid, but when there is a wheel/wheel speed monitor failure, the braking command is not reduced (to unlock a skid indicated by the low wheel speed indication).

More preferably, the one or more inputs providing an indication of whether or not a wheel of the wheel set has skidded comprise one or more inputs that provide an indication of whether or not the wheel had failed and/or one or more inputs that provide an indication of whether or not the wheel speed monitor had failed.

For example, if one of those two things is indicated, this may be taken as indication that wheel has not skidded.

Even more preferably, the one or more inputs form a collection of inputs that taken in combination indicate a wheel or wheel speed monitor failure.

In other words, each input on its own may not indicate whether or not a wheel failure has occurred, but the inputs taken together in combination do indicate whether or not a wheel/wheel speed monitor failure has occurred.

The one or more of the collection of inputs may indicate a scenario in which a certain wheel speed is expected.

The expected wheel speed may be between 5 and 50 knots. It may be between 10 and 30 knots. It may be between 15 and 25 knots. It may be approximately 20 knots.

Preferably, the one or more inputs indicating the scenario include one or more of the following:
an indication that the aircraft has landed on its main landing gear, and
an indication that the aircraft has rotated onto its nose landing gear.

For example, "weight on wheel" detection in one or more sensors in a right or left landing gear shock strut could indicate that the aircraft had landed on its main landing gear. For example, "weight on wheel" detection in one or more sensors in the nose landing gear shock strut could indicate that the aircraft has rotated onto its nose landing gear.

For example, if the aircraft had landed on the main landing gear and rotated onto the nose landing gear, and a wheel speed monitor indicated a low or zero wheel speed at that point, prior to any brake command being applied, this would indicate that the wheel had in fact failed, or that the wheel speed monitor had failed, rather than that the wheel had skidded. This is because it could be expected that all the wheels on the main landing gear would have had enough time to spin up to a relatively high speed, prior to the aircraft rotating onto its nose landing gear.

The aircraft brake control system may comprise a timer and a wheel or wheel speed monitor failure is indicated only if the one or more inputs providing an indication of whether or not a wheel or wheel speed monitor of the wheel set has failed, have done so for a threshold period of time.

This allows for temporary errors in readings and to prevent an antiskid braking command being used that is erroneously too high. For example, the threshold period of time may be between 1 and 20 seconds, for example, between 2 and 10 seconds, for example approximately 5 seconds. This time scale is considered to give a balance between erroneously applying a higher braking command (i.e. assuming a wheel or wheel speed monitor had failed) when a wheel has actually skidded (and thus prevent tyre burst from prolonged skidding) and applying a lower braking command for much longer than necessary.

The one or more inputs providing an indication of whether or not a wheel of the wheel set has skidded may comprise one or more inputs that provide an indication of whether or not the wheel had failed.

These may include one or more inputs from:
i) the cockpit (for example from activating a pilot button, that an image from a camera pointing at the wheel/wheel set indicates that a wheel or tyre has failed—e.g. the pilot can see that a tyre has burst),
ii) an AI computer (that an image from a camera pointing at the wheel/wheel set indicates that a wheel or tyre has failed—e.g. the AI detects that a tyre has burst),
iii) a laser monitoring wheel rotation or tyre position (the laser could detect a burst before landing due to the wheel/tyre not rotating as expected),
iv) a tyre pressure monitor (able to detect tyre failure),
v) a light sensor inside the tyre or wheel (if it is able to detect light, this indicates the tyre has failed),
vi) an ultrasound sensor (able to detect tyre failure),
vii) a proximity sensor detecting a tyre location (a missing tyre location indicates it has failed), and
viii) a torque sensor, load sensor or vibration sensor (indicating an imbalance of the wheel, landing gear or attitude of the axle that could indicates tyre bursts).

As can be seen from some of the examples above, the indication may occur prior to when the braking control actually occurs (e.g. prior to landing of the aircraft).

The one or more inputs providing an indication of whether or not a wheel of the wheel set has skidded may comprise one or more inputs that provide an indication of whether or not the wheel speed monitor had failed.

Preferably, the one or more inputs include one or more inputs from:
i) an electronic monitor of a wheel tachometer,
ii) functional monitoring of the tachometer, and
iii) a second or further tachometer.

The tachometer, or second of further tachometers, may comprise Hall Effect sensors or lasers/LED light tachometers.

The control assembly may comprise an input of an indication of a flight phase of the aircraft.

This may indicate that it is an appropriate phase for use of the antiskid braking function. For example, it may indicate that aircraft is in main braking phase (between touchdown and taxiing), rather than when taxiing to a gate (where antiskid braking is not required, as the aircraft speed and wheel speeds are much slower).

This indication may include an indication of a ground speed of aircraft. The control assembly may consider that a certain flight phase is occurring when the aircraft ground speed indicated is above a certain threshold speed. The threshold speed may be between 5 m/s and 30 m/s, for example between 10 m/s and 20 m/s, for example approximately 15 m/s. The aircraft ground speed may be obtained from an inertial reference system (IRS). For example, an IRS ground speed of over 15 m/s would indicate that the aircraft is in the main braking mode.

The indication may include an indication of flight phase of the aircraft, which may be obtained from a flight management computer. For example, a flight phase of 8 or 9 would indicate that the aircraft is in the main braking phase.

The indication may include an indication of whether or not thrust reversers of the aircraft are active. For example, flight reversers being active would indicate that the aircraft is in the main braking phase.

The indication may include an indication of whether or not spoilers of the aircraft are active. For example, spoilers being active would indicate that the aircraft is in the main braking phase.

The indication may include an indication from ground proximity sensors of the aircraft. For example, the aircraft being close to or on the ground would indicate that the aircraft is in the main braking phase.

The aircraft brake control system may further comprise an anti-skid braking calculator for calculating an antiskid braking command to be applied to the wheels of the wheel set in an antiskid mode, and wherein the output of the control assembly is provided to the antiskid braking calculator such that the antiskid braking command is calculated based on the output wheel speed indication.

Hence, the antiskid braking calculator calculates a suitable braking command for the wheels of the wheel set. This could be based on a speed other than the lowest wheel speed. Or, where there is wheel/wheel speed monitor failure detection functionality, it could be based on a lowest speed wheel if no wheel/wheel speed monitor failure is detected or a higher speed (i.e. not the lowest speed) if wheel/wheel speed monitor failure is detected.

Preferably, the aircraft brake control system further comprises a control valve for supplying a braking command to the wheels in the wheel set, and wherein, when in an antiskid mode, the control valve is provided with the antiskid braking command and supplies that antiskid braking command to the wheels of the wheel set.

The same braking command is supplied to all of the different wheels in the wheel set. In other words, the wheels in the wheel set are commonly supplied with a braking command by the control valve.

The control valve may be a hydraulic valve for supplying a hydraulic braking pressure to the wheels of the wheel set. Alternatively, the control valve may be an electromagnetic valve.

More preferably, the control valve is connected to an energy supply.

The energy supply may be a hydraulic fluid supply.

Alternatively, the energy supply may be an electrical energy supply.

The energy supply may be a backup energy supply configured to be connected to the control valve when another energy supply is not available.

This especially useful when a tyre burst may have caused an energy supply (for example, a hydraulic energy supply) to become unavailable. Prior to the invention, a tyre burst would have meant a backup energy supply is being used and also that the burst tyre has lessened the braking capacity available. To then, in the back up mode, base the antiskid braking command on the speed measured on the burst tyre wheel would further, unnecessarily, reduce the braking performance. Here, the back up mode is capable of assessing when it would be appropriate for the brake command to be reduced and so would not do so based on the burst tyre wheel speed.

The energy supply may be a hydraulic fluid supply and wherein the hydraulic fluid supply is a backup fluid supply configured to be connected to the control valve when another energy supply, for example another hydraulic fluid supply, is not available.

The "another energy supply/hydraulic fluid supply" may be referred to as a "yellow" energy supply/hydraulic fluid supply and maybe connected to the control valve by a "yellow" energy supply line/hydraulic fluid line. The backup energy supply/fluid supply may comprise an energy accumulator/hydraulic accumulator/electrical battery with a finite supply available. The accumulator may be located on the yellow energy supply line/hydraulic fluid line.

There may also be a further (for example, a normal) energy supply, for example a further/normal hydraulic fluid supply, that may normally supply energy to the control valve. The further energy supply/hydraulic fluid supply may be referred to as a "green" energy supply/hydraulic fluid supply and may be connected to the control valve by a "green" energy supply line/hydraulic fluid line. The another (yellow) energy supply/hydraulic fluid supply may be used when the further (green) energy supply/hydraulic supply is not available.

Hence, the system may have three modes, depending on what supply (further/normal/green, another/alternate or back up) is available; a normal mode when green supply is available, an alternate mode when the green supply is not available and the yellow supply is, and an emergency mode (using the accumulator) when neither the yellow supply nor the green supply is not available.

The brake control system may control antiskid braking in the alternate and/or emergency modes. It may control antiskid braking when the yellow energy supply line/hydraulic fluid line is used and/or when the green energy supply is not available.

If the system comprises only a further energy supply (and not another energy supply), the further energy supply is the another energy supply. In other words, the further energy supply is the energy supply the backup energy supply is a backup to. Here, the backup energy supply may be located on a different energy supply line to the energy supply it is a backup for.

If the system comprises just the another energy supply, and not the further energy supply, the backup energy supply is a backup to the another energy supply. Here, the backup energy supply may be located on the same energy supply line to the energy supply it is a backup for.

Preferably, the control assembly further comprises an input indicating whether or not the another energy supply is available.

This input can be used to determine if the antiskid braking control is to be applied by the control valve (for example, because the (alternate or) emergency mode(s) are in use).

Alternatively, or additionally, the control assembly further comprises an input indicating whether or not the further energy supply is available. This input can be used to determine if the antiskid braking control is to be applied by the control valve (for example, because the alternate or emergency modes are in use).

According to a second aspect of the invention there is also provided an aircraft landing gear comprising the aircraft brake control system described above and a wheel set configured to be controlled in antiskid braking by the aircraft brake control system.

The aircraft landing gear may be a main—for example right or left—landing gear. The wheel set may include all or only some of the wheels present on the landing gear. For example, there may be a second wheel set on the landing gear similar to the wheel set referred to above. The second wheel set may similarly be controlled in antiskid braking by a similar second aircraft brake control system. Alternatively, the landing gear may be a nose landing gear.

According to a third aspect of the invention there is also provided an aircraft comprising the aircraft brake control system as described above or an aircraft landing gear as described above. The aircraft may comprise more than one aircraft brake control system as described above or more than one aircraft landing gear as described above.

According to a fourth aspect of the invention there is also provided a method of braking an aircraft comprising the step of providing the aircraft brake control system as described above, an aircraft landing gear as described above or an aircraft as described above.

According to a fifth aspect of the invention there is also provided a method of braking an aircraft comprising the steps of measuring a wheel speed of a first wheel in a wheel set of an aircraft, measuring a wheel speed of a second wheel in the wheel set of an aircraft, determining which of the wheels has a lowest wheel speed, calculating an antiskid brake command based on a measured wheel speed other than the lowest wheel speed, and applying that antiskid brake command to the wheels in the wheel set.

Such a method allows for the two or more wheels in the wheel set to be controlled based on a wheel speed, which is not the lowest wheel speed. This increases the brake performance over a conventional anti-skid braking method, which would use an output of a lowest wheel speed to control the antiskid braking command. For example, if the lowest speed wheel (say, for example the first wheel) had in fact failed (e.g. burst) or where its tachometer (wheel speed indicator) had a fault, rather than the wheel had skidded, the braking command (sent to all wheels of the wheel set) is not unnecessarily reduced. This is especially helpful in the situation of a burst tyre, as braking performance is already lowered due to the burst tyre (here, of the first wheel) and so it is especially advantageous not to lower the braking performance further by lowering the braking command to the working wheels (here, the second wheel and any other wheels in the wheel set).

The invention may be applied to any number of wheels (above one) in a wheel set. The wheels of the wheel set are all commonly controlled by the same braking command (i.e. they are commonly brake controlled wheels). When there are only two wheels in the wheel set, the "wheel speed other than the lowest wheel speed" will be the highest wheel speed of the wheel set.

All or only some (but at least two) of the wheels in the wheel set may have their wheel speed indicated.

The "wheel speed other than the lowest wheel speed" may be the lowest wheel speed of the wheel set that is still above a certain likely skid threshold value. The likely skid threshold value may represent a speed above which the wheel is unlikely to be skidding. Hence, the braking command may be reduced only for wheels that are actually likely to be skidding. This likely skid threshold value may be between 5 and 50 knots. It may be between 10 and 30 knots. It may be between 15 and 25 knots. It may be approximately 20 knots.

The "wheel speed other than the lowest wheel speed" may be the highest wheel speed of the wheel set.

Preferably, the method further comprises the steps of providing an indication of whether or not a wheel of the wheel set has skidded, and calculating an antiskid brake command based on a measured wheel speed other than the lowest wheel speed, if a wheel skid is not indicated.

A wheel skid not being indicated may occur when a wheel or wheel speed monitor failure is indicated, instead.

More preferably, the method further comprises the steps of switching from a first setting in which an antiskid brake command would be calculated based on the lowest wheel speed, to a second setting, the switching occurring when a wheel skid is not indicated (for example, when a wheel/wheel speed monitor failure is indicated), and in the second setting, calculating the antiskid brake command based on the measured wheel speed other than the lowest wheel speed.

This enables a higher wheel speed (i.e. not the lowest wheel speed) to be used as the base for the antiskid braking command, when there is no wheel skid indicated.

When the lowest speed does in fact indicate a locked/skidding wheel, the antiskid braking command is based on the lowest wheel speed (first setting). Hence, when there is a locked/skidded wheel, the braking command sent to that wheel (and the other commonly brake controlled wheels of the wheel set) is reduced to unlock the skid of the (low speed) wheel. This increases braking performance (due to unlocking skidding wheels) and prevents tyres from bursting due to skidding.

However, the system also does not reduce the braking command unnecessarily if the low speed wheel has in fact failed (e.g. already burst) or its tachometer (or other wheel speed meter) has failed, rather than skidded. In this scenario (second setting), the wheel/wheel speed monitor failure is detected and the braking command applied to the wheels of the wheel set would not be reduced and so braking performance would be improved.

Importantly, when there is a wheel skid, the braking command is reduced to unlock the skid, but when there is a wheel/wheel speed monitor failure, the braking command is not reduced.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
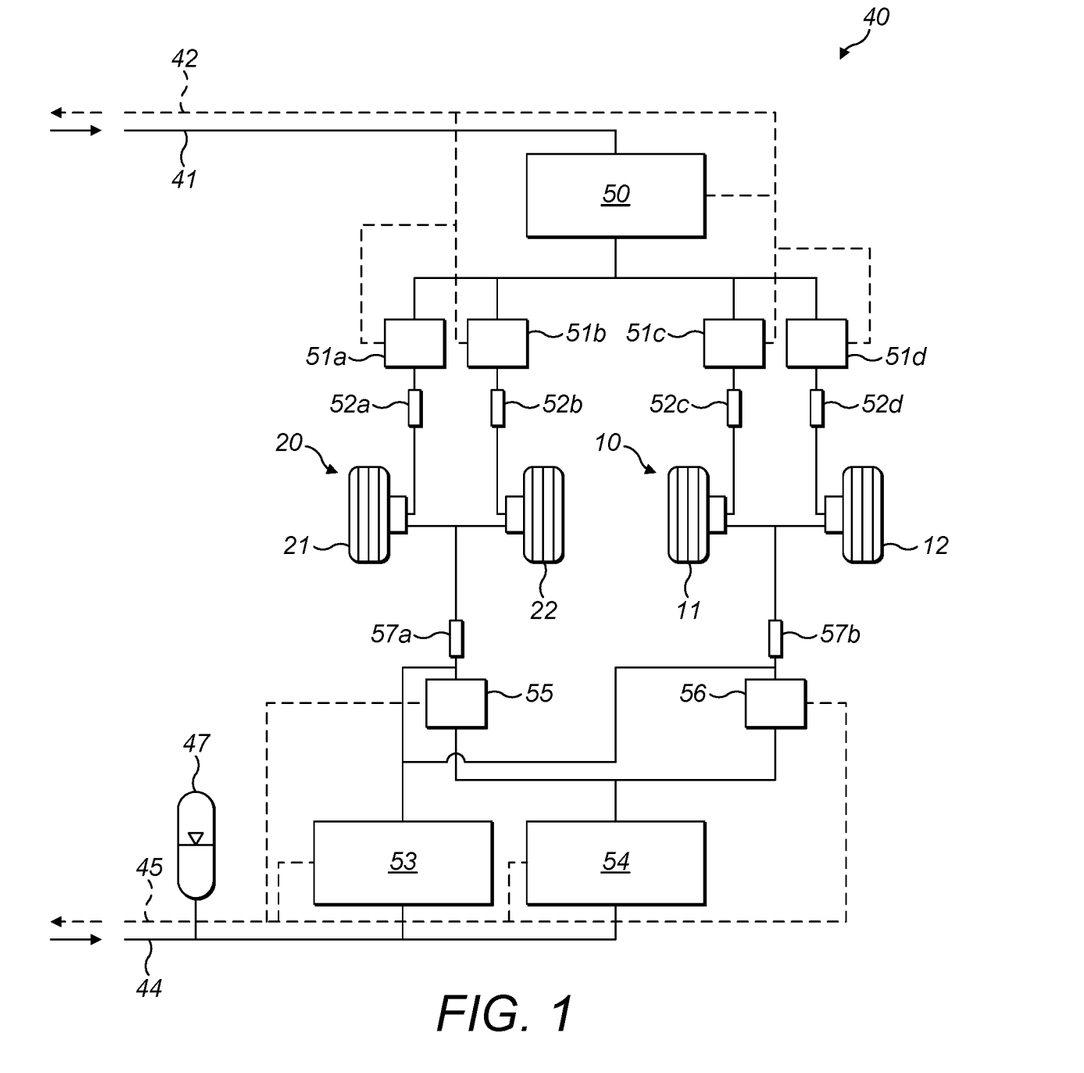
FIG. 1 shows a schematic view of right and left main aircraft landing gears and associated brake control, for use with embodiments of the invention.

FIG. 1 shows a schematic view of right 10 and left 20 main aircraft landing gears and associated brake control, for use with embodiments of the invention.

The right main landing gear 10 comprises a right landing gear leg and first 11 and second 12 wheels. The left main landing gear 20 comprises a left landing gear leg and first 21 and second 22 wheels.

There is a hydraulic fluid system 40 comprising a normal/"green" supply line 41, connected to a "green" hydraulic fluid supply (not shown), and a normal/"green" return line 42. These "green" lines 41, 42 are used in normal operation when the "green" hydraulic fluid supply is available.

The hydraulic fluid system 40 also comprises an alternate/"yellow" supply line 44, connected to a "yellow" hydraulic fluid supply (not shown), and an alternate/"yellow" return line 45. These "yellow" lines 44, 45 are used when the "green" hydraulic supply is not available.

The hydraulic fluid system 40 also comprises an accumulator 47 located on the "yellow" supply line 44. This supplies a finite amount of hydraulic fluid through the "yellow" supply line 44 when the "green" and "yellow" supplies are not available.

A BSCU (Braking and Steering Control Unit) chooses and commands the braking mode. When in normal braking (i.e. when using the "green" supply) the braking is controlled by a normal brake selector valve 50 and four normal servo valves 51a, b, c, d that provide an individual braking command (of hydraulic fluid) to each of the four wheels 21, 22, 11, 12 respectively. The normal brake selector valve 50 is there to prevent uncommanded braking in the case of a servo valve failing open. There are also four fuses 52a, b, c, d on the hydraulic line between the valves 51a, b, c, d and the wheels 21, 22, 11, 12. The fuses prevent fluid loss if the hydraulic lines are severed in a failure.

In the normal mode, i.e. using the "green" supply, the braking command to each of the four wheels 21, 22, 11, 12 is individually controlled. Hence, each individual valve 51a, b, c, d can be provided with a different control current from an antiskid brake control system such that antiskid braking is separately controlled for each wheel.

When the "green" supply is not available, an alternate brake mode is selected by the BSCU. When in alternate braking, the braking is controlled by an alternate brake selector valve 54 and two direct drive valves 55, 56 that provide a paired braking command (of hydraulic fluid) to the two sets of wheels 21 and 22, and 11 and 12 respectively. In other words, valve 55 controls the braking command to wheels 21 and 22 and valve 56 controls the braking command to wheels 11 and 12. Wheels 21 and 22 (in one wheel set) are provided with the same braking command as each other (from valve 55). Wheels 11 and 12 (in another wheel set) are provided with the same braking command as each other (from valve 56). The alternate brake selector valve 54 is there to prevent uncommanded braking in the case of a servo valve failing open. There are also two fuses 57a, b on the hydraulic line between the valves 55, 56 and the wheels pairs 21, 22, 11, 12. The fuses prevent fluid loss if the hydraulic lines are severed in a failure.

In the alternate mode, i.e. using the "yellow" supply, the braking command to wheels 21, 22, 11, 12 is controlled in pairs (wheel sets). Hence, antiskid braking is controlled separately for each wheel pair, not each wheel individually.

The emergency mode (where the "yellow" supply is not available) using the accumulator 47 is also controlled through valve 54 and so in the emergency mode the antiskid braking is similarly controlled separately for each wheel pair, not each wheel individually.

There is also a park brake selector valve 53 able to provide "yellow" hydraulic fluid to the valves 55, 56. This valve 53 may be used in combination with the normal brake selector valve 50 to provide a dual braking command (through both "green" and "yellow" supplies) to the wheels when the aircraft is parked.

Figure 2:
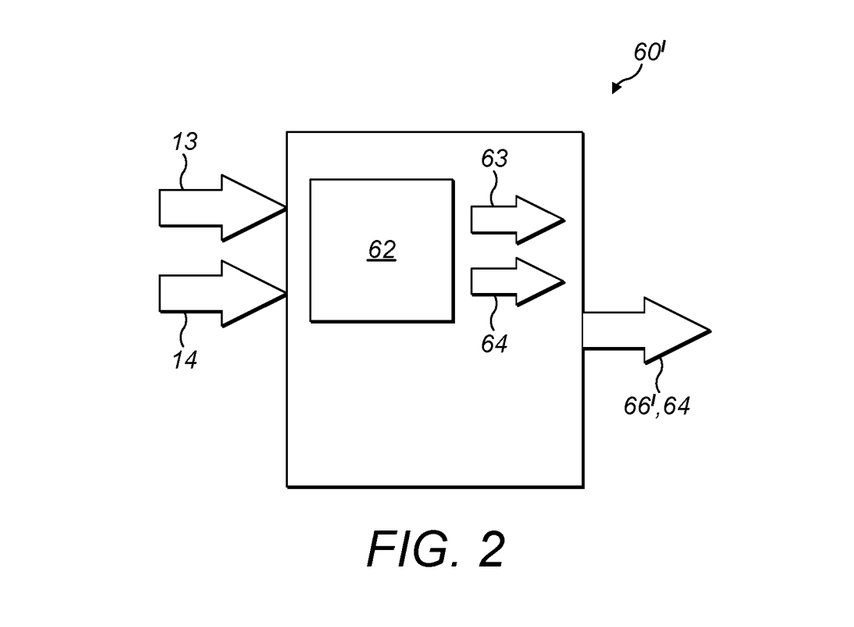
FIG. 2 shows a schematic view of a brake control unit according to a first embodiment of the invention.

FIG. 2 shows a schematic view of a brake control unit 60' according to a first embodiment of the invention.

The control unit 60' is for controlling the antiskid braking of the right pair of wheels 11, 12 (wheel set) when in alternative or emergency braking mode, but it could equally be applied to the left wheels 21, 22.

The unit 60' has an input of the wheel speed of the first wheel 11 (labelled as 13) and the wheel speed of the second wheel 12 (labelled as 14). The control unit also has a wheel speed comparator 62 for determining which are the minimum and maximum wheel speeds from wheel speeds 13 and 14. These are output from the comparator 62 as minimum wheel speed 63 and maximum wheel speed 64. The unit 60' then outputs (as output 66') the maximum wheel speed 64.

The output 66' is what is sent to determine the antiskid braking command that is sent to the direct drive valve 56. In other words, the antiskid braking command is calculated based on the output 66' and therefore based on the maximum wheel speed 64.

This output 66' of the maximum wheel speed 64 is done irrespective of other factors. In other words, the control system assumes that the slower wheel is not skidding substantially more than the faster wheel and so it is appropriate to base the antiskid calculation on the higher speed wheel.

The control unit 60' may comprise a number of other inputs that indicate that the alternate/emergency braking mode is in use, similar to inputs 43, 46 as described in relation to FIG. 3 below.

Figure 3:
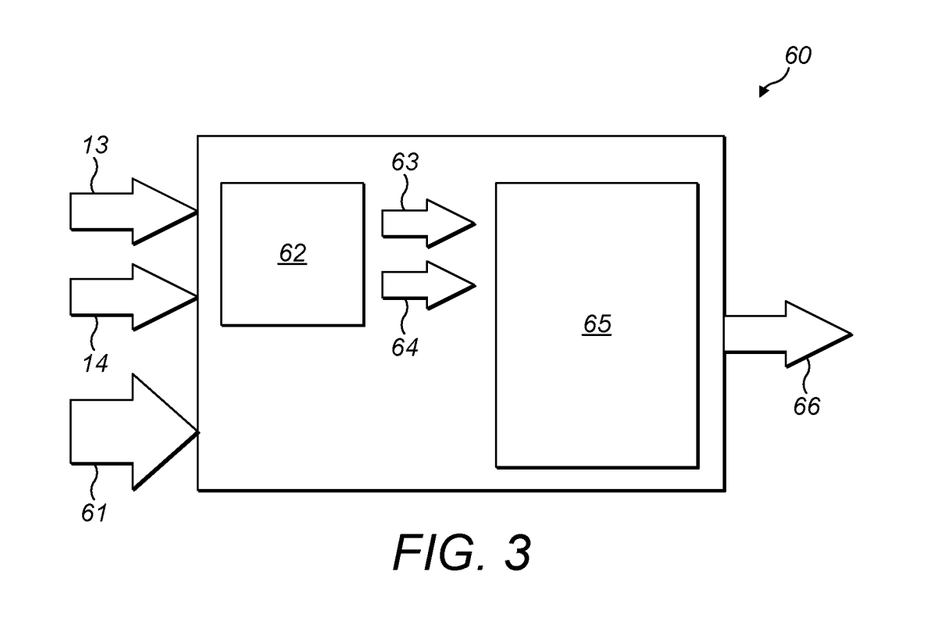
FIG. 3 shows a schematic view of a brake control unit according to a second embodiment of the invention.

FIG. 3 shows a schematic view of a brake control unit 60 according to a second embodiment of the invention. This unit 60 is similar to the control unit 60' of FIG. 2 but has additional complexity and logic considerations, as will be explained. Where identical elements are referred to, the reference numerals (in FIGS. 2 and 3) do not have a '. The ' indicates elements of FIG. 2 that are similar, but not the same, to those of FIG. 3.

As before, the control unit 60 is for controlling the antiskid braking of the right pair of wheels 11, 12 (wheel set) when in alternative or emergency braking mode, but it could equally be applied to the left wheels 21, 22.

The unit 60 has an input of the wheel speed of the first wheel 11 (labelled as 13) and the wheel speed of the second wheel 12 (labelled as 14). The control unit also has a wheel speed comparator 62 for determining which are the minimum and maximum wheel speeds from wheel speeds 13 and 14. These are output from the comparator 62 as minimum wheel speed 63 and maximum wheel speed 64.

There is also a plurality of inputs, labelled as 61. These inputs 61 comprise the following inputs:

a. a "weight on wheel" detection signal from a first sensor in the right landing gear 10 leg (shock strut). This is labelled as 15 in FIG. 4.
b. a "weight on wheel" detection signal from a second sensor in the right landing gear 10 leg (shock strut). This is labelled as 16 in FIG. 4.
c. a "weight on wheel" detection signal from a sensor in the nose landing gear 30 leg (shock strut). This is labelled as 35 in FIG. 4.
d. a signal indicating if the "green" hydraulic supply is available. This is labelled as 43 in FIG. 4.
e. a signal indicating if the "yellow" hydraulic supply is available. This is labelled as 46 in FIG. 4. and
f. a signal from the Inertial Reference System of the ground speed of the aircraft. This is labelled as 75 in FIG. 4.

The inputs 61 and the minimum wheel speed 63 and maximum wheel speed 64 are input into a logic unit 65 of the control unit 60. The logic unit 65, with the various inputs, is shown in the more detailed control unit 60 view in FIG. 4 (see below).

The control unit 60 then outputs (as output 66) either the minimum wheel speed 63 or the maximum wheel speed 64. The output 66 is what is sent to determine the antiskid braking command that is sent to the direct drive valve 56. In other words, the antiskid braking command is calculated based on the output 66 and therefore may be based on the minimum wheel speed 63 or the maximum wheel speed 64.

Figure 4:
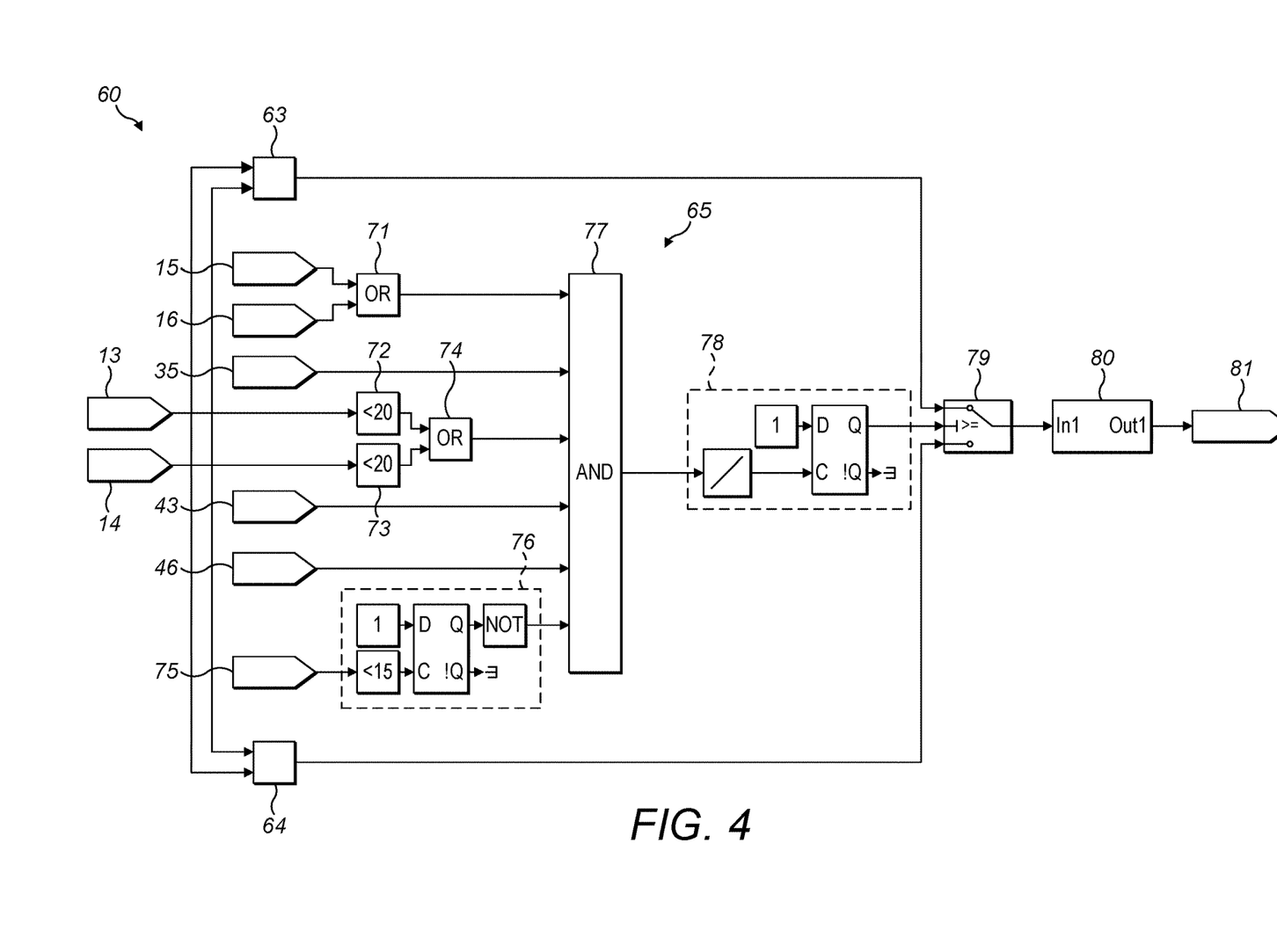
FIG. 4 shows a more detailed schematic view of the brake control unit of FIG. 3.

FIG. 4 shows a more detailed schematic view of the brake control unit 60 of FIG. 3.

As already described, the unit 60 has the various inputs, shown on the left hand side of FIG. 4 (from left to right and top to bottom):
a. wheel speed 13 of wheel 11.
b. wheel speed 14 of wheel 12.
c. a "weight on wheel" detection signal from a first sensor in the right landing gear 10 leg (shock strut). This is labelled as 15 in FIG. 4.
d. a "weight on wheel" detection signal from a second sensor in the right landing gear 10 leg (shock strut). This is labelled as 16 in FIG. 4.
e. a "weight on wheel" detection signal from a sensor in the nose landing gear 30 leg (shock strut). This is labelled as 35 in FIG. 4.
f. a signal indicating if the "green" hydraulic supply is available. This is labelled as 43 in FIG. 4.
g. a signal indicating if the "yellow" hydraulic supply is available. This is labelled as 46 in FIG. 4. and
h. a signal from the Inertial Reference System of the ground speed of the aircraft. This is labelled as 75 in FIG. 4.

The wheel speed comparator 62 is effectively shown in two parts. A first part, at the top of FIG. 4, labelled as 63 takes the minimum wheel speed 63 of the two input speeds 13, 14. A second part, at the bottom of FIG. 4, labelled as 64 takes the maximum wheel speed 64 of the two input speeds 13, 14.

The "weight on wheel" signals (from the right landing gear 10) labelled as 15 and 16 are input into an OR box 71, which outputs to an AND box 77. Hence, if either of the sensors detect that there is weight on the wheels of the right landing gear 10, then the AND box 77 receives a positive signal here.

The "weight on wheel" signal (from the nose landing gear 30) labelled as 35 is input to the AND box 77. Hence, if the sensor detects that there is weight on the wheels of the nose landing gear 10, then the AND box 77 receives a positive signal here.

The two wheel speeds 13, 14 are also input into logic boxes 72, 73 to determine if they are under 20 knots, respectively. These signals are provided to an OR box 74, which outputs to an AND box 77. Hence, if either of the wheel speeds 13, 14 are under 20 knots, the AND box 77 receives a positive signal here.

The signal 43 indicating if the "green" hydraulic supply is available is input to AND box 77. The AND box 77 receives a positive signal if the "green" supply is not available.

The signal 46 indicating if the "yellow" hydraulic supply is available is input to AND box 77. The AND box 77 receives a positive signal if the "yellow" supply is not available.

The Inertial Reference System signal 75 of the ground speed of the aircraft is inputted to a logic box 76 that outputs a positive signal to the AND box 77 as long as the aircraft ground speed is over 15 m/s.

Hence, the AND box 77 receives all positive signals if:
a. the aircraft has landed on the main gear and then has rotated onto its nose gear
b. any of the wheels have not reached a speed of 20 knots
c. the "green" and "yellow" hydraulic supplies are not available, and
d. the aircraft speed is over 15 m/s.

These first two of these (a and b) indicate that a wheel or a wheel speed monitor may have failed. This is because an aircraft that has landed on its main wheels and then rotated onto its nose wheel(s) would be expected to have main landing gear wheels that have spun up to above 20 knots. This is because the main wheels would have had a chance to do that prior to the nose wheels rotating to the ground. Also, no brakes would yet be applied to the wheels and so the wheels should not be skidded.

The third of these (c) is to ensure that the antiskid brake command is only calculated in the way to be described when both the yellow and green supplies are not available. i.e. that that hydraulic power is coming from the accumulator 47 and the emergency braking mode is being used.

The last of these (d) is to ensure that the aircraft is at a speed where skidding is possible. In other words, the antiskid brake command is not to be calculated as described when the aircraft is under 15 m/s as then no skidding would be expected.

If the AND box 77 receives all positive signals, it outputs a positive signal to logic box 78. Logic box 78 comprises a timer of 5 seconds and outputs a positive signal if it has received a positive signal from the AND box 77 for the last 5 seconds.

The positive signal from box 78 is sent to a switch 79. The switch 79 also receives the minimum wheel speed 63 and the maximum wheel speed 64. The switch 79 starts (as a default) by linking its output to the minimum wheel speed 63. However, whenever it receives a positive signal from the logic box 78 it switches its output to be the maximum wheel speed 64.

Hence, the switch 79 outputs the maximum wheel speed 64 if all of the inputs into the AND box 77 are positive for the last 5 seconds. Otherwise, it outputs the minimum wheel speed 63. The switch 79 outputs to an antiskid brake calculator 80 that calculates the required antiskid brake command based on the wheel speed (either maximum 64 or minimum 63) input into it. It then outputs this antiskid brake command current 81. This command current 81 is what is sent to the direct drive valve 56 to control the brake command to the right wheels 11, 12.

Figure 5A:
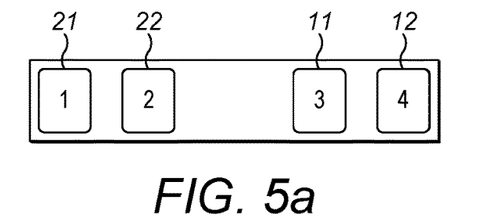
FIG. 5a shows a first wheel scenario that may occur in the aircraft landing gear of FIG. 1.

The way the control system 60 (and a similar control system for the left landing gear wheels) works, in use, when in emergency mode, will now be described in relation to four scenarios:

FIG. 5*a* shows a first wheel scenario that may occur in the aircraft landing gear of FIG. 1.

Here, all four wheels 11, 12, 21, 22 are intact and the wheel tachometers functioning correctly. Here, when the aircraft has landed on the main gear and then has rotated onto its nose landing gear all of the four wheels would have reached speeds of over 20 knots and the aircraft ground speed would be over 15 m/s.

Hence, as all wheels 11, 12, 21, 22 are over 20 knots, the output from logic box 74 (in both the right and left landing gear control units 60) would be negative and so this would not "trigger" the AND box 77 and so the switches 79 of the two control units 60 would continue to output the minimum wheels speeds 63 to the antiskid brake calculators 80.

Hence, when one of the wheels out of 11 or 12 skidded, the antiskid brake command sent to those two wheels 11, 12 (from valve 55) would be calculated based on the minimum wheel speed 63 in order to release the skidded (lowest speed) wheel. Similarly, when one of the wheels out of 21 or 22 skidded, the antiskid brake command sent to those two wheels 21, 22 (from valve 56) would be calculated based on the minimum wheel speed 63 in order to release the skidded (lowest speed) wheel.

Figure 5B:
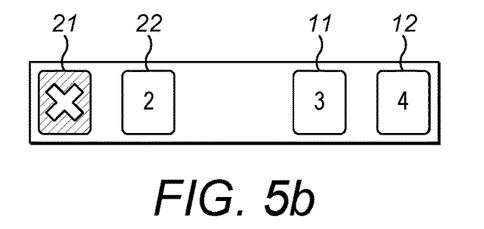
FIG. 5b shows a second wheel scenario that may occur in the aircraft landing gear of FIG. 1.

FIG. 5*b* shows a second wheel scenario that may occur in the aircraft landing gear of FIG. 1.

Here, wheel 21 has failed e.g. burst (or its tachometer has failed). Here, when the aircraft has landed on the main gear and then has rotated onto its nose landing gear all of wheels 11, 12, 22 would have reached speeds of over 20 knots (and would be indicated as such by their respective tachometers) and the aircraft ground speed would be over 15 m/s. However, the tachometer for wheel 21 would show a zero or low speed.

Hence, as both wheels 11, 12 are over 20 knots, the output from logic box 74 (in the right landing gear control unit 60) would be negative and so this would not "trigger" the AND box 77 and so the switch 79 would continue to output the minimum wheel speed 63 to the antiskid brake calculator 80. Hence, when one of the wheels out of 11 or 12 skidded, the antiskid brake command sent to those two wheels 11, 12 would be calculated based on the minimum wheel speed 63 in order to release the skidded (lowest speed) wheel.

However, as wheel 21 would appear to have a speed less than 20 knots, the output from logic box 74 (in the left landing gear control unit 60) would be positive and so this would "trigger" the AND box 77 and so the switch 79 would then output the maximum wheel speed 64 (i.e. the speed of wheel 22) to the antiskid brake calculator 80. Hence, when wheel 22 skidded, the antiskid brake command sent to it (and wheel 21) is calculated based on the maximum wheel speed 64 (which would be that of wheel 22) and so this releases the skid of wheel 22.

Figure 5C:
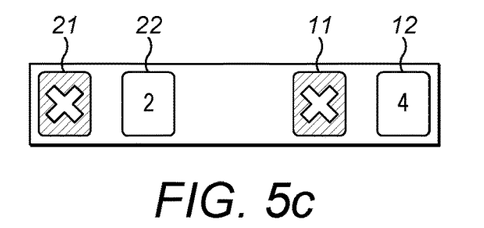
FIG. 5c shows a third wheel scenario that may occur in the aircraft landing gear of FIG. 1.

FIG. 5*c* shows a third wheel scenario that may occur in the aircraft landing gear of FIG. 1.

Here, both wheels 21 and 11 have failed e.g. burst (or their tachometers have failed). Here, when the aircraft has landed on the main gear and then has rotated onto its nose landing gear, wheels 22, 12 would have reached speeds of over 20 knots (and would be indicated as such by their respective tachometers) and the aircraft ground speed would be over 15 m/s. However, the tachometer for wheels 21 and 11 would show a zero or low speed.

Hence, as wheel 11 would appear to have a speed less than 20 knots, the output from logic box 74 (in the right landing gear control unit 60) would be positive and so this would "trigger" the AND box 77 and so the switch 79 would then output the maximum wheel speed 64 (that of wheel 12) to the antiskid brake calculator 80. Hence, when wheel 12 skidded, the antiskid brake command sent to it (and wheel 11) is calculated based on the maximum wheel speed 64 (which would be that of wheel 12) and so this releases the skid of wheel 12.

Similarly, as wheel 21 would appear to have a speed less than 20 knots, the output from logic box 74 (in the left landing gear control unit 60) would be positive and so this would "trigger" the AND box 77 and so the switch 79 would then output the maximum wheel speed 64 (that of wheel 22) to the antiskid brake calculator 80. Hence, when wheel 22 skidded, the antiskid brake command sent to it (and wheel 21) is calculated based on the maximum wheel speed 64 (which would be that of wheel 22) and so this releases the skid of wheel 22.

Figure 5D:
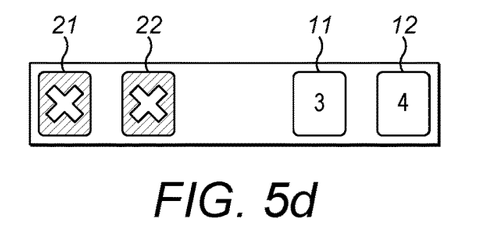
FIG. 5d shows a fourth wheel scenario that may occur in the aircraft landing gear of FIG. 1.

FIG. 5*d* shows a fourth wheel scenario that may occur in the aircraft landing gear of FIG. 1.

Here, wheels 21 and 22 have failed e.g. burst (or their tachometers have failed). Here, when the aircraft has landed on the main gear and then has rotated onto its nose landing gear, wheels 11, 12 would have reached speeds of over 20 knots (and would be indicated as such by their respective tachometers) and the aircraft ground speed would be over 15 m/s. However, the tachometer for wheels 21 and 22 would show a zero or low speed.

Hence, as both wheels 11, 12 are over 20 knots, the output from logic box 74 (in the right landing gear control unit 60) would be negative and so this would not "trigger" the AND box 77 and so the switch 79 would continue to output the minimum wheel speed 63 to the antiskid brake calculator 80. Hence, when one of the wheels out of 11 or 12 skidded, the antiskid brake command sent to those two wheels 11, 12 would be calculated in order to release the skidded wheel, i.e. would be based on the minimum wheel speed (the skidded wheel).

However, as wheels 21 and 22 would appear to have a speed less than 20 knots, the output from logic box 74 (in the left landing gear control unit 60) would be positive and so this would "trigger" the AND box 77 and so the switch 79 would then output the maximum wheel speed 64 to the antiskid brake calculator 80. Hence, say wheel 21 had failed (tachometer showing zero speed) and wheel 22 had a faulty tachometer (perhaps showing a lower than actual speed) and had then skidded, the antiskid brake command sent to wheels 21, 22 is calculated based on the maximum wheel speed 64 (the speed of wheel 22) and so this would likely release the skid of wheel 22.

Figure 6:
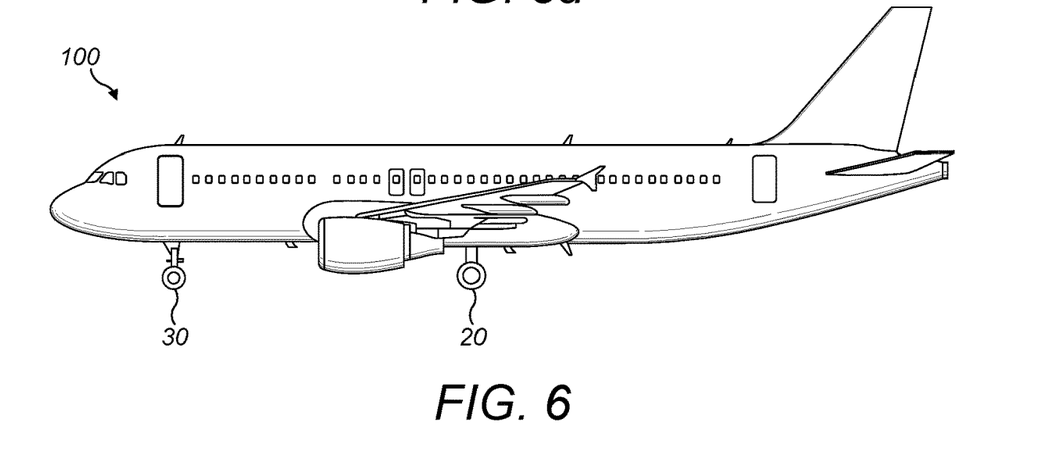
FIG. 6 shows an aircraft comprising the landing gear of FIG. 1.

FIG. 6 shows an aircraft 100 comprising the right (not shown in FIG. 6) and left 20 main landing gear of FIG. 1. The aircraft also has nose landing gear 30.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In the above examples, the control function takes place in a single unit (60 or 60'). However, the same inputs, logic, output could be distributed over a control assembly, with different parts of the linked assembly being located in different portions of the aircraft, for example.

In the above examples, there are two wheels (11 and 12, and 21 and 22) in each of two wheel sets. However, there could be any number of wheel sets on each landing gear and each wheel set could have any number of wheels (above one). What may define a wheel set is that the wheels of the wheel set are commonly brake controlled in a braking mode.

All or only some (but at least two) of the wheels in the wheel set may have their wheel speed indication inputted to the control assembly.

It does not have to be the highest (or maximum) wheel speed in the wheel set that is used for the antiskid brake calculation, even when the switch 79 has been triggered. It could be a different wheel speed from the wheel set. It may be the highest wheel speed of the wheel set that is still below a certain likely skid threshold value. The likely skid threshold value may represent a speed above which the wheel is unlikely to be skidding. Hence, the braking command may be reduced only for wheels that are actually likely to be skidding. This likely skid threshold value may be between 5 and 50 knots. It may be between 10 and 30 knots. It may be between 15 and 25 knots. It may be approximately 20 knots.

In the above examples, thresholds of 20 knots and 15 m/s are used, but any suitable threshold values may be used.

In the above examples, a timer of 5 seconds is used but any suitable time period may be used.

In the above examples, the antiskid braking is controlled as described in the emergency mode only. However, it could additionally or alternatively be used in the alternate ("yellow" supply) mode. Here, the "yellow" supply not available input 46 to the control unit 60 would not be required to trigger the AND box 77, or it may be required to be negative (i.e. that the "yellow" supply is available) to trigger the AND box 77.

The input(s) 61 may include one or more inputs from:
i) the cockpit (for example from activating a pilot button, that an image from a camera pointing at the wheel/wheel set indicates that a wheel or tyre has failed—e.g. the pilot can see that a tyre has burst),
ii) an AI (Artificial Intelligence) computer (that an image from a camera pointing at the wheel/wheel set indicates that a wheel or tyre has failed—e.g. the AI detects that a tyre has burst),
iii) a laser monitoring wheel rotation or tyre position (the laser could detect a burst before landing due to the wheel/tyre not rotating as expected),
iv) a tyre pressure monitor (able to detect tyre failure),
v) a light sensor inside the tyre or wheel (if it is able to detect light, this indicates the tyre has failed),
vi) an ultrasound sensor (able to detect tyre failure),
vii) a proximity sensor detecting a tyre location (a missing tyre location indicates it has failed), and
viii) a torque sensor, load sensor or vibration sensor (indicating an imbalance of the wheel, landing gear or attitude of the axle that could indicates tyre bursts).

The input(s) 61 may include one or more inputs from:
i) an electronic monitor of a wheel tachometer,
ii) functional monitoring of the tachometer, and
iii) a second or further tachometer.

The tachometer, or second of further tachometers, may comprise hall effect sensors or lasers/LED light tachometers.

The input(s) 61 may include an indication of a flight phase of the aircraft, which may be obtained from a flight management computer, and/or from an indication of whether or not thrust reversers of the aircraft are active and/or whether or not spoilers of the aircraft are active and/or from an indication from ground proximity sensors of the aircraft.

In the above examples, hydraulic fluid is used as an energy supply, instead electrical energy may be used instead of some or all of the supplies.

In the above examples, the braking command is applied to the main (right and/or left) landing gear wheels. However, it could additionally or alternatively be applied to the nose landing gear wheels.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

It should be noted that throughout this specification, "or" should be interpreted as "and/or".

Although the invention has been described above mainly in the context of a fixed-wing aircraft application, it may also be advantageously applied to various other applications, including but not limited to applications on vehicles such as helicopters, drones, trains, automobiles and spacecraft.

The invention claimed is:

1. An aircraft brake control system for controlling antiskid braking of at least first and second wheels in a wheel set of an aircraft, the system comprising a control assembly having:
    wheel speed inputs including:
        an input of an indication of the wheel speed of one or more wheels, and
        determining a threshold value at which the one or more wheels is unlikely to skid, and
        an anti-skid output for maintaining the one or more wheels within the threshold value, wherein the control assembly also has one or more inputs providing an indication of whether or not a wheel of the wheel set has skidded, and wherein the output is a selective output configured to indicate:
    a wheel speed other than the lowest wheel speed, if a wheel skid is not indicated, and
    the lowest wheel speed, if a wheel skid is indicated.

2. An aircraft brake control system as claimed in claim 1, wherein the one or more inputs providing an indication of whether or not a wheel of the wheel set has skidded comprise one or more inputs that provide an indication of whether or not the wheel had failed and/or one or more inputs that provide an indication of whether or not a wheel speed monitor had failed.

3. An aircraft brake control system as claimed in claim 2, wherein the one or more inputs form a collection of inputs that taken in combination indicate a wheel or wheel speed monitor failure.

4. An aircraft brake control system as claimed in claim 3, wherein the one or more of the collection of inputs indicate a scenario in which a certain wheel speed is expected.

5. An aircraft brake control system as claimed in claim 4, wherein the one or more inputs indicating the scenario include one or more of the following:

an indication that the aircraft has landed on its main landing gear, and an indication that the aircraft has rotated onto its nose landing gear.

6. An aircraft brake control system as claimed in claim 2, wherein the control assembly comprises a timer and a wheel or wheel speed monitor failure is indicated only if the one or more inputs providing an indication of whether or not a wheel or wheel speed monitor of the wheel set has failed, have done so for a threshold period of time.

7. An aircraft brake control system as claimed in claim 2, wherein the one or more inputs providing an indication of whether or not a wheel of the wheel set has skidded comprise one or more inputs that provide an indication of whether or not the wheel had failed.

8. An aircraft brake control system as claimed in claim 7, wherein the one or more inputs include one or more inputs from:
i) the cockpit,
ii) an AI computer,
iii) a laser monitoring wheel rotation or tyre position,
iv) a tyre pressure monitor,
v) a light sensor inside the tyre or wheel,
vi) an ultrasound sensor,
vii) a proximity sensor detecting a tyre location, and
viii) a torque sensor, load sensor or vibration sensor.

9. An aircraft brake control system as claimed in claim 2, wherein the one or more inputs providing an indication of whether or not a wheel of the wheel set has skidded comprise one or more inputs that provide an indication of whether or not the wheel speed monitor had failed.

10. An aircraft brake control system as claimed in claim 9, wherein the one or more inputs include one or more inputs from:
i) an electronic monitor of a wheel tachometer,
ii) functional monitoring of the tachometer, and
iii) a second or further tachometer.

11. An aircraft brake control system as claimed in claim 1, wherein the control assembly comprises an input of an indication of a flight phase of the aircraft.

12. An aircraft brake control system as claimed in claim 1, further comprising an anti-skid braking calculator for calculating an antiskid braking command to be applied to the wheels of the wheel set in an antiskid mode, and wherein the output is provided to the antiskid braking calculator such that the antiskid braking command is calculated based on the output wheel speed indication.

13. An aircraft brake control system as claimed in claim 12, further comprising a control valve for supplying a braking command to the wheels in the wheel set, and wherein, when in an antiskid mode, the control valve is provided with the antiskid braking command and supplies that antiskid braking command to the wheels of the wheel set.

14. An aircraft brake control system as claimed in claim 13, wherein the control valve is connected to an energy supply and, preferably wherein the energy supply comprises a hydraulic fluid supply.

15. An aircraft brake control system as claimed in claim 13, wherein the energy supply is a backup energy supply configured to be connected to the control valve when another energy supply is not available.

16. An aircraft brake control system as claimed in claim 15, wherein the control assembly further comprises an input indicating whether or not the another energy supply is available.

17. An aircraft landing gear comprising the aircraft brake control system as claimed in claim 1, and further comprising a wheel set configured to be controlled in antiskid braking by the aircraft brake control system.

18. An aircraft comprising the aircraft brake control system as claimed in claim 1.

19. A method of braking an aircraft comprising the step of providing the aircraft brake control system as claimed in claim 1.

20. A method of braking an aircraft comprising the steps of:
measuring a wheel speed of one or move wheels of an aircraft,
determining a threshold value at which the one or more wheels is unlikely to skid,
providing an antiskid output,
maintaining the one or more wheels within the threshold value,
providing an indication of whether or not a wheel of the wheel set has skidded, and
calculating an antiskid brake command based on a measured wheel speed other than the lowest wheel speed, if a wheel skid is not indicated.

21. A method of braking an aircraft as claimed in claim 20, further comprising the steps of:
switching from a first setting in which an antiskid brake command would be calculated based on the lowest wheel speed, to a second setting, the switching occurring when a wheel skid is not indicated, and
in the second setting, calculating the antiskid brake command based on the measured wheel speed other than the lowest wheel speed.

* * * * *